United States Patent
Le Ravalec et al.

(10) Patent No.: US 8,032,345 B2
(45) Date of Patent: Oct. 4, 2011

(54) METHOD FOR UPDATING A GEOLOGICAL MODEL USING DYNAMIC DATA AND WELL TESTS

(75) Inventors: Mickaële Le Ravalec, Rueil-Malmaison (FR); Frédéric Roggero, Rueil-Malmaison (FR); Véronique Gervais, Rueil-Malmaison (FR)

(73) Assignee: IFP, Cedex (FR)

( * ) Notice: Subject to any disclaimer, the term of this patent is extended or adjusted under 35 U.S.C. 154(b) by 501 days.

(21) Appl. No.: 12/186,548

(22) Filed: Aug. 6, 2008

(65) Prior Publication Data

US 2009/0070086 A1    Mar. 12, 2009

(30) Foreign Application Priority Data

Sep. 6, 2007    (FR) .................... 07 06256

(51) Int. Cl.
  *G06G 7/48*    (2006.01)
(52) U.S. Cl. .......................................... 703/10
(58) Field of Classification Search ............. 703/10
  See application file for complete search history.

(56) References Cited

U.S. PATENT DOCUMENTS

| | | | |
|---|---|---|---|
| 4,558,176 A * | 12/1985 | Arnold et al. .................. 713/190 |
| 7,363,163 B2 * | 4/2008 | Le Ra Valec-Dupin et al. .................. 702/12 |
| 7,392,166 B2 * | 6/2008 | Le Ravalec-Dupin et al. . 703/10 |
| 7,558,708 B2 * | 7/2009 | Le Ravalec-Dupin et al. ... 703/2 |
| 7,657,413 B2 * | 2/2010 | Le Ravalec-Dupin et al. . 703/10 |
| 2003/0028325 A1 | 2/2003 | Roggero et al. |
| 2006/0047489 A1 | 3/2006 | Scheidt et al. |

FOREIGN PATENT DOCUMENTS

| | | |
|---|---|---|
| FR | 2 886 740 | 12/2006 |
| FR | 2 890 453 | 3/2007 |

OTHER PUBLICATIONS

French Search Report, FR 0706256, Apr. 23, 2008.
Gajraj et al., "Simultaneous Fine- and Coarse-Scale Reservoir Description Using Static and Dynamic Data", In Situ, 20(4), 395-411 (1996).

* cited by examiner

*Primary Examiner* — Paul Rodriguez
*Assistant Examiner* — Eun Kim
(74) *Attorney, Agent, or Firm* — Antonelli, Terry, Stout & Kraus, LLP.

(57) ABSTRACT

Method for optimizing the development of an underground reservoir, wherein a geological model is updated using dynamic data and well tests.

A reservoir model is constructed by performing a geological model scale change. Dynamic data are simulated from this reservoir model. Influence zones are identified within the geological model where the well tests induce a pressure variation during well testing. Well tests are then simulated for each influence zone. An objective function measuring the difference between the simulated data and the measured data is calculated. The geological model is then modified so as to reduce to the maximum the objective function using a geostatistical parametrizing technique. Finally, development of the underground reservoir is optimized by evaluating, by means of a flow simulator, the reservoir production for various production schemes.

Application: notably oil reservoir development.

20 Claims, 2 Drawing Sheets

METHOD FOR UPDATING A GEOLOGICAL MODEL USING DYNAMIC DATA AND WELL TESTS

FIELD OF THE INVENTION

The present invention relates to the sphere of petroleum exploration and production. More particularly, the invention relates to a method for optimizing the development of underground reservoirs, by constructing a geological model representative of the reservoir, so as to meet dynamic data and well tests.

Optimization and development of petroleum reservoirs are based on the most accurate possible description of the structure and of the petrophysical properties of the reservoir studied. Specialists therefore use a tool allowing to account for these two aspects in an approximate way: a geological model. A geological model is thus intended to best account for the structure and the petrophysical properties of a reservoir. The geological model consists of various elements: a grid pattern that forms the frame of the reservoir and that has to be representative of the structure, and two- or three-dimensional petrophysical property maps associated with this grid, that have to be representative of the static or dynamic behaviour of the reservoir. What is referred to as a geological model of a reservoir thus is an object representing a discretization of the reservoir.

In order to predict the dynamic behaviour of a reservoir under production, numerical flow simulations are carried out from the geological model. To reduce uncertainties and to obtain a model representative of reality, the geological model has to be conditioned by all of the data available. In order to apply this modelling type by integrating various data sources, the model is parametrized, i.e. parameters referred to as model matching parameters are defined. By way of example, the matching parameters can be the mean petrophysical properties of the facies (permeability, porosity, etc.), geostatistical properties such as some parameters of the variogram (range, anisotropy direction, etc.) or the coefficients of the laws relating some properties (vertical anisotropy ratio, porosity/permeability law, etc.).

Taking dynamic data into account requires a methodology suited to modify the models obtained from geostatistical modelling applied to the static data. This stage consisting in adjusting an existing model so that it is coherent with dynamic data is referred to as history matching. This matching process must allow to adjust certain parameters of the geological model so as to reproduce dynamic data measured in the field, while keeping the coherence with the static data and the geostatistical properties.

What is referred to as dynamic data is the data evolving as a function of the reservoir production. These data can be production data or data obtained from repeated seismic surveys (4D). Production data are collected in the well throughout the reservoir development process.

Well tests correspond to actions that are more concentrated in time. At given times, engineers carry out well tests, i.e. they produce for some hours or some days while meeting certain flow rate or pressure conditions, and they follow the evolution of the pressures in the wells. These pressures provide information on the zones around the wells. The principle of well testing consists in measuring the pressure in a well subjected to flow rate variations. The measurements can be taken during production or during a well stoppage period. The information deduced from well tests, i.e. pressures and pressure derivatives with respect to time, is used daily for drilling, completion, production, etc.

It is therefore essential to constrain the geological models by this type of information.

BACKGROUND OF THE INVENTION

During some decades, well tests have allowed to determine some reservoir characteristics such as the formation permeability (assumed to be constant), the skin factor, the reservoir pressure. However, there are few methods for refining reservoir models by integrating both production data and well tests. One reason for this phenomenon is that the well testing technology is especially based on analytical solutions that are not directly compatible with the discrete representations used for the models in reservoir simulation.

With the advent of numerical flow simulators, it appeared that well tests can contribute to refining the description of the geological model: spatial distribution of the permeability values, boundary distance estimation, etc. A flow simulator is software allowing, among other things, to model the production of a reservoir as a function of time, from measurements describing the reservoir, i.e. from a reservoir model.

Considering that there is no method suited for simultaneous integration of well tests and production data in numerical reservoir models, a conventional technique consists in matching the well test data using the same approach as for matching the production data, but separately. Such a technique is for example described in the following document:

Mezghani, M., 1999, <<Caractérisation des réservoirs hétérogènes: méthode des sentinelles et quantification des incertitudes>>, Ph.D. thesis, Univ. Paul Sabatier, Toulouse, France.

It consists in entering as the input data, in software referred to as flow simulator, the flow rate data, in simulating the pressures and in comparing them with the pressures measured during the well test. The parameters of the model are then modified as long as pressure matching is not satisfactory.

There is also a known method for simultaneously matching the pressures, the pressure derivatives and the production data:

Landa, J. L., 1997, Reservoir parameter estimation constrained to pressure transients, performance history and distributed saturation data, Ph.D. thesis, Stanford Univ., Stanford, Calif.

According to this approach, the production data and the well tests are simulated at the same scale, i.e. the reservoir scale. Now, the well tests correspond to a finer scale than the reservoir scale.

Finally, there is another known method, called NWT (Numerical Well Testing). This method is described in:

Kamal, M. M., Pan, Y., Landa, J. L., and Thomas, O. O., 2005, "Numerical well testing —A method to use transient testing results in reservoir simulation", SPE 95905, Dallas, Tex.

The drawback of the NWT method is that well test matching and production data matching are dissociated.

The object of the invention thus is an alternative method for optimizing the development of underground reservoirs, by constructing a geological model representative of the reservoir, meeting dynamic data and well tests.

SUMMARY OF THE INVENTION

The invention thus is a method for optimizing the development of an underground reservoir from a geological model representative of the reservoir, from dynamic data obtained from measurements within said reservoir and from data resulting from well tests carried out in wells traversing said reservoir. The method comprises the following stages:

A) Modifying said geological model so as to meet the measured dynamic data and the data resulting from well tests, by carrying out the following stages:
constructing a reservoir model by performing a scale change for said geological model,
simulating dynamic data from said reservoir model by means of a flow simulator,
identifying influence zones for said geological model where the well tests induce a pressure variation during well testing,
simulating well tests for each influence zone by means of a flow simulator,
calculating an objective function comprising a term measuring a difference between the measured dynamic data and the simulated dynamic data, a term measuring a difference between the data obtained from said well tests and data obtained from well test simulations,
modifying said geological model so as to reduce the objective function, using a geostatistical parametrizing technique, then repeating the previous stages until a minimum value is obtained for the objective function, and B) optimizing the development of the underground reservoir by evaluating, by means of a flow simulator, the production of said reservoir for various production schemes applied to said geological model.

Boundary conditions can be applied to the zones defined as a function of the reservoir model to simulate the well tests for each influence zone. These boundary conditions can be calculated during simulation of the dynamic data or modelled from the sentinel method.

Concerning the data resulting from the well tests, they can be pressures and pressure derivatives. Furthermore, the objective function can comprise a term relative to data obtained from a 4D seismic survey.

According to the method, the geostatistical parametrizing technique can be the pilot point method, or the probability perturbation method, or the gradual deformation method.

BRIEF DESCRIPTION OF THE FIGURES

Other features and advantages of the method according to the invention will be clear from reading the description hereafter of non-limitative embodiment examples, with reference to the accompanying figures wherein.

DETAILED DESCRIPTION

Figure 1:
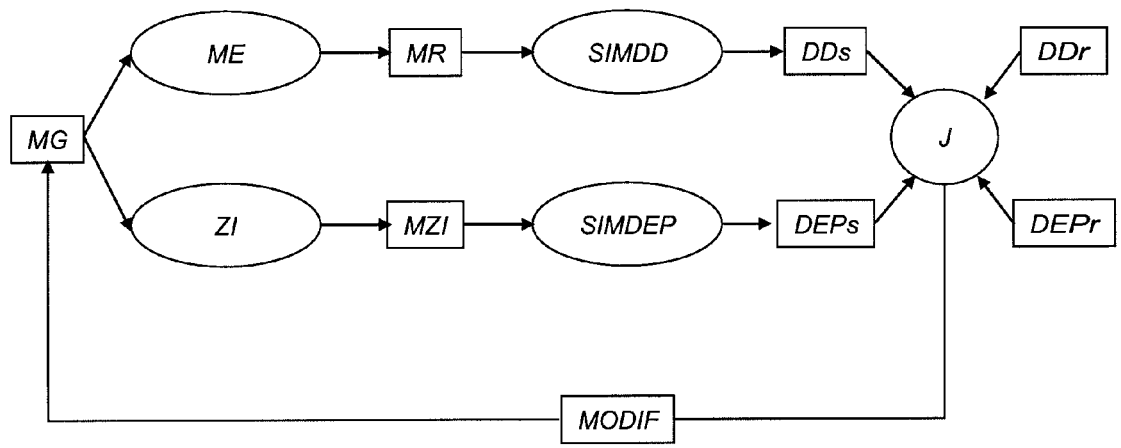
FIG. 1 is a diagram of the various stages of the production data and well test matching method.

The alternative method for optimizing the development of underground reservoirs comprises constructing a geological model representative of the reservoir, meeting both dynamic data and well tests. The method takes account of the scale differences between the well tests and the dynamic data. It allows matching of these two data types to be processed simultaneously. The methodology provided is diagrammatically shown in FIG. 1. The main stages of the process are as follows:

1) a geological model (MG) is generated at a fine scale, i.e. a fine grid pattern. This model meets the static data, i.e. the data that do not depend on the movements of the fluid within the reservoir (log data, data measured on cores taken in wells, seismic survey data, etc.). This model is constructed from stochastic techniques known to specialists, 2) the geological model is transferred to a coarse scale by applying a geological model upscaling procedure (ME), so as to construct a reservoir model (MR). The reservoir model is thus associated with a coarse grid pattern. Such a reservoir model is used because it contains much less grid cells than the fine geological model (MG). In fact, the CPU time required for a flow simulation becomes acceptable in practice, 3) a flow simulation is carried out for the reservoir model (SIMDD), by means of a flow simulator, in order to calculate the responses corresponding to the production data, or any other dynamic data (DDs), 4) well tests are analyzed in order to identify influence zones (ZI), i.e. zones where the well test induces a pressure variation. This stage thus consists in evaluating the radius of investigation for each well subjected to well testing. A large number of definitions is available in the literature for characterizing the radius of investigation:

Van Poolen H. K., "*Radius of drainage and stabilization time equations*", Oil and Gas Journal, Sep. 14, 1964, pp. 138-146.

By way of example, Jones defines the radius of investigation by the place in the reservoir where the pressure evolution represents 1% of the evolution observed in the well. On the basis of the analytical solution of the pressure evolution as a function of time in a homogeneous medium, the radius of investigation is then expressed as follows:

$$r_i = 4\sqrt{\frac{kt}{\phi \mu c_t}},$$

as a function of permeability k, time t, porosity $\phi$, viscosity $\mu$ and total compressibility $c_t$.

It is also possible to use the method described in Thompson, L. G., and Reynolds, A. C., 1997, Well testing for radially heterogeneous reservoirs under single and multiphase flow conditions, SPEFE, March, 57-64.

These influence zones are associated with fine grid patterns (MZI).

5) The well tests are simulated for each influence zone (SIMDEP). The simulator can be here the same as the simulator used in stage 3. The pressure responses are then obtained, from which the pressure derivatives with respect to time are deduced. These data as a whole are referred to as DEPs. For this stage, it is necessary to specify the boundary conditions applied to the zones (ZI) extracted from the fine model (MG) to simulate the well tests. Three embodiments are described:

a. The boundary conditions are unknown and arbitrarily fixed by the user. For example, impermeable boundaries or of constant pressure can be considered.

b. The boundary conditions are calculated when performing the flow simulation on the reservoir model (MR). This information is then used to constrain the flow simulations on the fine extracted zones. For example, the coarse simulation allows to know the flows on the interfaces of the coarse grid cells. These flows can be redistributed on the interfaces of the fine cells proportionally to the transmissivities. Such a technique is for example described in Gautier, Y., Blunt, M., and Christie, M., 1999, <<Nested gridding and streamline-based simulation for fast reservoir performance prediction>>, Computational Geosciences, 295-320.

c. The boundary conditions are not well known. Using the sentinel method (Lions, 1988) to identify the parameters of the model allows this condition to be considered. This method allows to model a noise on the boundary conditions. It is described in:

Lions, J.-L., 1988, <<Sur les sentinelles des systémes distribuès. Conditions frontières, termes sources, coefficients incomplétement connus>>, C. R. Acad. Sci., Paris, 307, 865-870.

6) An objective function (J) measuring the difference between the real data (DDr and DEPr) and the corresponding simulated responses (DDs and DEPs) is constructed. Typically, this function comprises:

a. A term for measuring the difference between the real dynamic data DDr and the simulated dynamic data DDs on the coarse grid pattern, b. a term for measuring the difference between the pressure data ($p_i$) recorded during the well tests and the simulated pressures ($g(t_f)_i$) on the fine extracted grid patterns, c. a term for measuring the difference between the derivatives deduced from the pressure data ($dp_i$) recorded during the well tests and derivatives ($dg(t_f)_i$) estimated from the simulated pressures on the fine extracted grid patterns.

$$J(t_f, t_g) = \frac{1}{2}\sum_i w_i[g(t_f, t_g)_i - DDr_i]^2 + \frac{1}{2}\sum_i v_i[g(t_f)_i - p_i]^2 + \frac{1}{2}\sum_i q_i[dg(t_f)_i - dp_i]^2$$

Coefficients w, v and q are weights that express the confidence in the various data types. Operator g is the flow simulator. Vector t represents all of the parameters of the problem: it comprises coarse parameters $t_g$ and fine parameters $t_f$. The parameters of the problem are for example the production parameters (position of the faults, fault transmissivities, activity coefficients of the aquifers, well skin factors, etc.), or the petrophysical parameters (porosity, permeability, etc.).

The objective function could also be enriched by the data obtained from 4D seismic surveys.

7) The objective function is reduced by modifying (MODIF) the parameters of the model. The parameters that are the most delicate to deal with are the petrophysical parameters: the goal is to modify the spatial distributions of the porosity and permeability values while preserving the global spatial structure, characterized by statistical properties estimated from static data (measurements on cores, logs, seismic interpretation, etc.). According to an embodiment, a geostatistical parametrizing technique such as the pilot point method can be used. The pilot point method is presented in Marsily, G. de, 1978, <<De l'identification des systémes hydrogèologiques>>, Ph.D. thesis, Paris VI University. It allows to modify the reservoir model locally around the pilot points.

According to an embodiment, a geostatistical parametrizing technique such as the probability perturbation method can also be used. This method is presented in Hoffman B. T., Caers J., 2005, <<Regional probability perturbations for history matching>>, Journal of Petroleum Science and Engineering, 46, 53-71. It allows to modify a numerical reservoir model globally or locally. This method has close similarities to the gradual deformation method used according to the preferred embodiment described hereafter.

According to a preferred embodiment, the gradual deformation method is used. This method was proposed by Hu, L.-Y., 2000, <<Gradual deformation and iterative calibration of Gaussian-related stochastic models>>, Math. Geol., 32(1), 87-108. It allows to perturb a realization of a random function (i.e. a possible image of the geological model) from a small number of parameters while preserving the spatial structure of this realization. The advantage of this method is that it allows to modify the realization globally or locally. When the gradual deformation is global, one considers a set of deformation coefficients that all apply identically to the cells of the model. When the gradual deformation is local, deformation coefficient sets are assigned to zones of the model and all the cells of a zone are identically affected by the corresponding coefficient set.

According to the invention, gradual deformation parameters are assigned to each of the zones extracted (ZI) from the fine model, and to the complement of the fine model. In order to be able to perform a local gradual deformation, i.e. a gradual deformation by zone, the gradual deformation process is applied to the Gaussian white noise used to generate the porosity or permeability realization.

Figure 2:
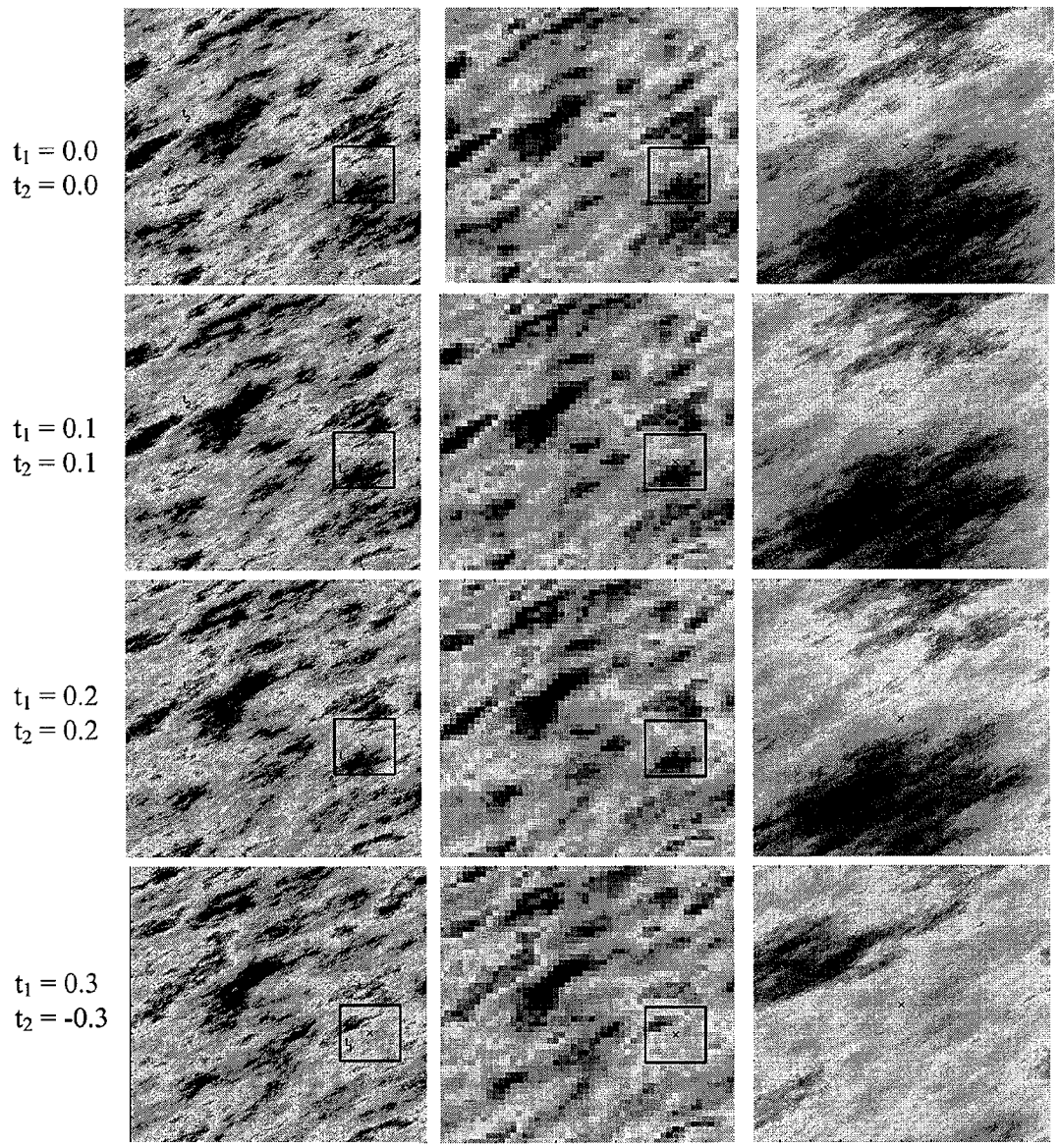
FIG. 2 illustrates the porosity evolution of the fine model (column 1), of the coarse model (column 2) deduced from the fine model and of the zone extracted (column 3) as a function of the values of deformation parameters $t_1$ and $t_2$.

An example is presented in FIG. 2. A well test is carried out in the well shown by a cross. The zone affected by this test is contained in the square surrounding the cross. A gradual deformation parameter $t_1$ is then assigned to this zone and another gradual deformation parameter $t_2$ is assigned to the rest of the domain. FIG. 2 shows the evolution of the fine porosity model (left column), the evolution of the coarse porosity model deduced from the fine model from an arithmetic mean (centre column), and the evolution of the porosity in the zone extracted around the well (right column).

At the beginning, $t_1$ and $t_2$ follow the same evolution. Then, their values evolve independently of one another. One checks that, for any value of the parameters, the spatial continuity is preserved. According to this parametrizing, the objective function is minimized by modifying the production parameters and the gradual deformation parameters. Techniques well known to specialists such as gradient or non-gradient minimization techniques can be used (steepest descent method, Gauss-Newton method, Levenberg-Marquardt method, Powell method, simplex method, genetic algorithms, etc.). Several deformation parameters can be associated with a single zone. In this case, the number of degree of freedom for reducing the objective function is greater. One however has to make sure that two zones do not depend on the same parameter. When the parameters are modified, one goes back to stage 1 that is then repeated. The minimization process stops when the objective function is sufficiently small or, in other words, when data matching is reasonably good.

From this geological model constructed on a fine grid pattern, representative of the reservoir studied, this reservoir can be evaluated by studying and optimizing production schemes.

A production scheme is a reservoir development option. It comprises all the parameters required for production start of the reservoir. These parameters can be the position of a well, the completion level, the drilling technique, etc.

Studying a reservoir comprises two main stages: a reservoir characterization stage and a production prediction stage. The matching method according to the invention allows to perform a precise characterization in accordance with both the production data and the well tests.

For the production prediction stage at a given time, in order to improve this production or generally to increase the commercial efficiency of the field, the specialist has a tool called flow simulator. A flow simulator works by accepting input parameters and by solving physical equations of fluid mechanics in porous media in order to deliver information referred to as responses. All the input parameters are contained in the reservoir model. The properties associated with the cells of this model are then called parameters. These parameters are notably associated with the geology of the reservoir, the petrophysical properties, the development of the reservoir and the numerical options of the simulator. The responses (output data) provided by the simulator are, for example, the oil, water or gas production of the reservoir and of each well for different times.

Thus, by means of the matching method according to the invention and of a flow simulator, an underground reservoir can be evaluated and its production scheme optimized.

The invention claimed is:

1. A method for optimizing the development of an underground reservoir from a geological model representative of the reservoir, from dynamic data obtained from measurements within said reservoir and from data resulting from well tests carried out in wells traversing said reservoir, characterized in that the method comprises the following stages:
   A) modifying said geological model so as to meet the measured dynamic data and the data resulting from well tests, by carrying out the following stages:
      constructing a reservoir model by performing a scale change for said geological model,
      simulating dynamic data from said reservoir model by means of a flow simulator,
      identifying zones for said geological model where the well tests induce a pressure variation,
      simulating well tests for each zone by means of a flow simulator,
      calculating an objective function comprising a term measuring a difference between the measured dynamic data and the simulated dynamic data, a term measuring a difference between the data obtained from said well tests and data obtained from well test simulations,
      modifying said geological model so as to reduce the objective function, using a geostatistical parametrizing technique, then repeating the previous stages until a minimum value is obtained for the objective function, and
   B) optimizing the development of the underground reservoir by evaluating, by means of a flow simulator, the production of said reservoir for various production schemes applied to said geological model.

2. A method as claimed in claim 1, wherein well tests are simulated for each zone by applying boundary conditions to said zones defined as a function of said reservoir model.

3. A method as claimed in claim 2, wherein the boundary conditions are calculated upon simulation of the dynamic data.

4. A method as claimed in claim 2, wherein the boundary conditions are modelled from a sentinel method.

5. A method as claimed in claim 1, wherein the data resulting from well tests are pressures and pressure derivatives.

6. A method as claimed in claim 1, wherein the objective function comprises a term relative to data resulting from a 4D seismic survey.

7. A method as claimed in claim 1, wherein the geostatistical parametrizing technique is a pilot point method.

8. A method as claimed in claim 1, wherein the geostatistical parametrizing technique is a probability perturbation method.

9. A method as claimed in claim 1, wherein the geostatistical parametrizing technique is a gradual deformation method.

10. A method as claimed in claim 1, wherein identifying the zones for said geological model where the well tests induce a pressure variation comprises evaluating a radius of investigation within the reservoir measured from each well subjected to well testing.

11. A method as claimed in claim 10, wherein analyzing the well tests to identify the zones where the well tests induce a pressure variation comprises evaluating a radius of investigation within the reservoir measured from each well subjected to well testing.

12. A method for optimizing development of an underground reservoir from a geological model representative of the reservoir comprising the following stages:
   A) generating a fine grid pattern geological model conforming to static data from measurements of the reservoir;
   B) modifying the geological model so as to meet dynamic data obtained from measurements within the reservoir and data resulting from well tests carried out in wells traversing the reservoir, by carrying out the following stages:
      constructing a reservoir model by performing a scale change for the geological model,
      simulating dynamic data from said reservoir model by means of a flow simulator,
      analyzing the well tests to identify zones where the well tests induce a pressure variation, and associating the zones with the fine grid pattern geological model,
      simulating well tests for each zone by means of a flow simulator,
      calculating an objective function comprising a term measuring a difference between the measured dynamic data and the simulated dynamic data, a term measuring a difference between the data obtained from said well tests and data obtained from well test simulations,
      modifying said geological model so as to reduce the objective function, using a geostatistical parametrizing technique, then repeating the previous stages until a minimum value is obtained for the objective function; and
   C) optimizing the development of the underground reservoir by evaluating, by means of a flow simulator, the production of said reservoir for various production schemes applied to said geological model.

13. A method as claimed in claim 12, wherein well tests are simulated for each zone by applying boundary conditions to said zones defined as a function of said reservoir model.

14. A method as claimed in claim 13, wherein the boundary conditions are calculated upon simulation of the dynamic data.

15. A method as claimed in claim 13, wherein the boundary conditions are modelled from a sentinel method.

16. A method as claimed in claim 12, wherein the data resulting from well tests are pressures and pressure derivatives.

17. A method as claimed in claim 12, wherein the objective function comprises a term relative to data resulting from a 4D seismic survey.

18. A method as claimed in claim 12, wherein the geostatistical parametrizing technique is a pilot point method.

19. A method as claimed in claim 12, wherein the geostatistical parametrizing technique is a probability perturbation method.

20. A method as claimed in claim 12, wherein the geostatistical parametrizing technique is a gradual deformation method.

* * * * *